United States Patent [19]

Meyer

[11] 3,899,835
[45] Aug. 19, 1975

[54] DEWATERING APPARATUS

[76] Inventor: Arnfried Meyer, Neckargartachertrasse, 7101 Frankenbach, Germany

[22] Filed: Nov. 13, 1973

[21] Appl. No.: 415,325

[30] Foreign Application Priority Data
Nov. 13, 1972 Austria.................................. 9642

[52] U.S. Cl. ........................ 34/58; 34/236; 68/210; 210/329; 210/360 R; 233/26
[51] Int. Cl. ............................................ F26b 17/24
[58] Field of Search ........... 34/58, 133, 236, 8, 129, 34/105; 68/10, 25, 210; 210/360 R, 329; 233/1 R, 26, 27; 141/121, 173, 283

[56] References Cited
UNITED STATES PATENTS
| | | | |
|---|---|---|---|
| 2,383,240 | 8/1945 | Crewdson | 34/58 |
| 2,409,341 | 10/1946 | Borg | 141/121 |
| 2,452,638 | 11/1948 | Drum et al. | 34/58 |
| 2,609,100 | 9/1952 | Vitale | 210/329 |
| 3,742,738 | 7/1973 | Frotriede | 34/236 |

*Primary Examiner*—John J. Camby
*Assistant Examiner*—James C. Yeung
*Attorney, Agent, or Firm*—Craig & Antonelli

[57] ABSTRACT

A dewatering or hydroextractor system wherein a centrifugal dewatering unit and an independent conveyor unit are disposed in a housing between an article loading and unloading station. The containers are selectively operatively connected to the conveyor unit for transporting the articles to be dewatered from the loading station through the dewatering unit to the unloading station with the conveyor path only crossing the dewatering unit once whereby a container having articles to be dewatered is transported to the watering unit while a preceding container is transported to the unloading station and an empty container located at the unloading station is transported to the loading station to receive a new load of articles to be dewatered.

33 Claims, 9 Drawing Figures

DEWATERING APPARATUS

The present invention relates to an apparatus for the cyclic dewatering of laundry articles or the like which includes a dewatering means and a conveyor means for selectively transporting article batches disposed in a container from a loading station to the dewatering means and subsequently to the unloading station.

Dewatering systems are known which include a centrifuge or hydroextractor unit including a centrifugal drum pivotally mounted about a horizontal axis to permit the drum to assume a loading and spinning position with an upwardly oriented drum opening and an unloading position with a downwardly directed drum opening. A considerable disadvantage of such prior art construction lies in the fact that the drum can be either only loaded or unloaded or set into centrifugal rotation in a single instance. Thus, since only one of the the three functions can be achieved in a single instant dead times are constantly produced which result in a strongly discontinuous treatment process.

Additionally, dewatering systems are known having the form of a laundry press wherein the material to be pressed is fed on one side through a conveyor means extending through the press and is discharged on the other side after the pressing operation. A disadvantage of this prior art construction lies in the fact that the transportation is dependent upon the pressing operation with the conveying means being temporarily blocked and the material to be pressed lying unused on the conveyor means during the pressing operation.

Consequently, conventional dewatering systems result in either unfavorable succession of dewatering steps or they are complicated in their construction and-/or are disadvantageous in their mode of operation resulting in systems which are uneconomical in practice.

According to the present invention a conveyor means is constructed as a system independent of the dewatering unit with a self-contained conveyor path which only once crosses the dewatering station. The conveyor path transports receptacles containing the articles to be treated from and to the loading and unloading station during the dewatering process thereby making it possible for individual functions to overlap since during the dewatering of one batch of articles the already dewatered batch is conveyed to the unloading station and is unloaded and transported to further processing. Subsequently, the empty container, or simultaneously another container can be loaded thereby resulting in a loaded container always being available when the dewatering process is terminated.

A further feature of the present invention resides in providing the conveying device with receiving units for the reception and holding of the containers or receptacles with the conveying means being selectively coupled with the receiving units.

A further feature of the present invention resides in the arrangement of several containers with each container being provided with a receiving unit which can be selectively coupled with a commonly associated conveying means.

Accordingly, it is an object of the present invention to provide a dewatering system which avoids by simple means the aforementioned shortcomings and drawbacks encountered in the prior art.

Another object of the present invention resides in providing a dewatering system wherein the succession of dewatering steps is increased.

A further object of the present invention resides in providing a dewatering system which is compact in construction thereby permitting a close succession of the dewatering steps. A still further object of the present invention resides in increasing the number of successive dewatering steps thereby increasing the quanity of material which can be dewatered.

A still further object of the present invention resides in practically excluding the dead times between the functions of loading and dewatering and unloading of the dewatering system.

A still further object of the present invention resides in providing a dewatering system whereby a relatively small number of units may be employed to process a substantial quantity of articles to be treated.

A still further object of the present invention resides in providing a dewatering apparatus which represents an automatic operating intermediate link between a washing apparatus and a drying apparatus which not only functions as a conveyor of the articles to be processed but also as an hydroextractor.

These and other objects, features and advantages of the present invention will become more obvious from the following description when taken in conjunction with the accompanying drawing which shows, for the purposes of illustration only three embodiments in accordance with the present invention, and wherein:

Figure 1:
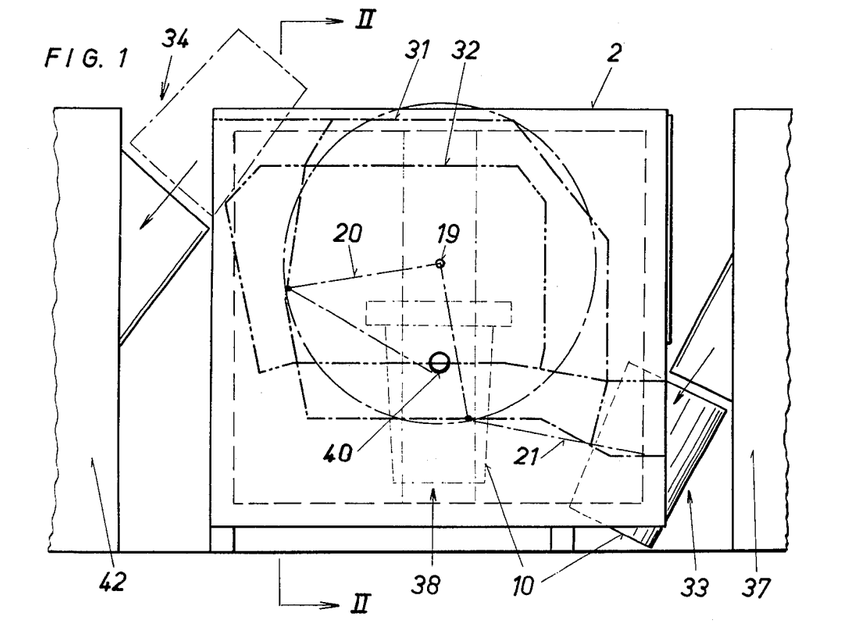
FIG. 1 is a lateral view of a first embodiment of the dewatering system according to the present invention.

Referring now to the drawings wherein like reference numerals are used throughout the various views to designate like parts, FIG. 1 illustrates a first embodiment of the dewatering or hydroextractor system of the present invention including a washing station 37, a loading station 33, a dewatering station 38, an unloading station 34, and a drying machine 42.

The dewatering station 38 is disposed in a housing between side walls 1, 2 and includes a centrifugal unit generally designated by the reference numeral 3 and conveying unit generally designated by the reference numeral 4.

Figure 2:
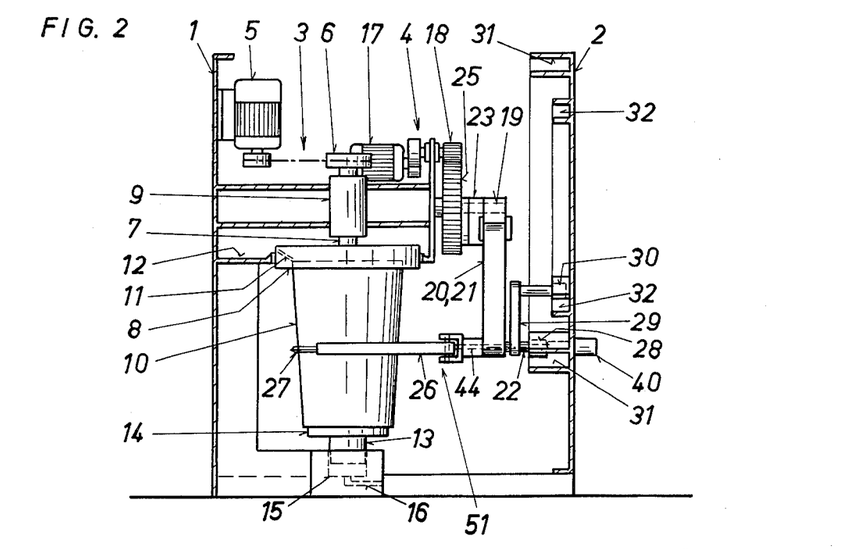
FIG. 2 is a section taken along line II—II of FIG. 1.

The centrifugal unit 3, as more clearly shown on FIG. 2, is provided with a drive motor 5 which, via drive wheel 6 and vertical shaft 7, mounted in a stepped supporting bearing 9 fixedly attached to the housing, selectively sets a lid or cover 8 into rotation.

The cover or lid 8 is provided on its underside with a receptacle for the centering and driving of a centrifugal drum or container 10. As the lid or cover 8 is set in rotation by the drive motor 5, water from articles disposed in the drum or container 10 is extracted by centrifugal force with the water thus extracted being discharged by way of ducts 11 radially directed toward the outside of the receptacle of the lid or cover 8. A collecting ring 12, surrounding the cover or lid 8, is provided by which the water, after exiting the ducts 11, is collected and conducted to the outside of the housing by way of pipe lines or the like (not shown).

As shown in FIG. 2, the container 10 flares conically in the upward direction and rests on a disk 14 rotatably supported in a servo-control cylinder 13 if the container is disposed in the dewatering or centrifugal unit 3. The servo-cylinder 13 is axially guided in a bore 15 and is selectively movable upwardly and downwardly upon the introduction or discharge of a pressure medium via a feed line 16 connected with a suitable pressure medium source (not shown).

The conveyor unit 4, as shown in FIG. 2, includes a motor 17 fixedly attached to a frame portion of the housing. A reduction gear system 18 is provided between the drive motor 17 and a drive shaft 19 which is set in motion by the drive motor 17. The drive shaft 19 has rotatably attached thereto the ends of a two toggle joints 20, 21 with the other ends of the toggle joints 20, 21 each freely rotatably supporting a connecting shaft 22.

Figure 4:
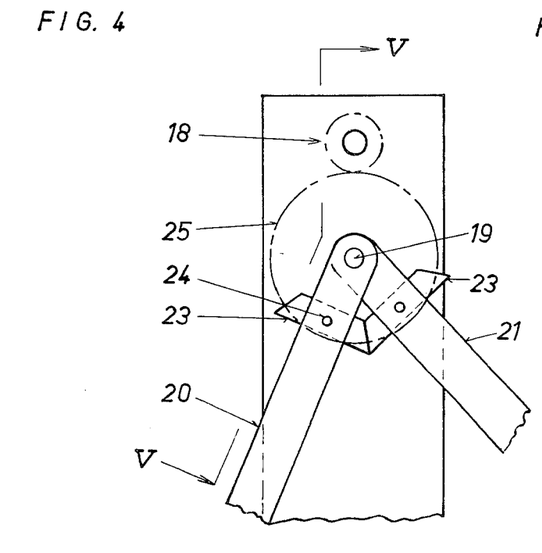
FIG. 4 is a drive arrangement for the conveying system of the present invention.
Figure 5:
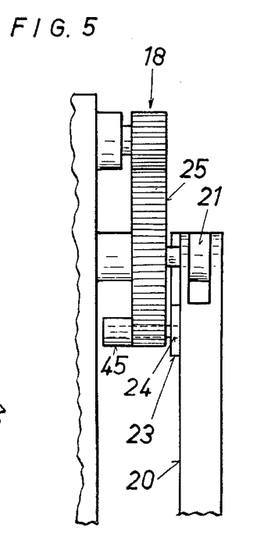
FIG. 5 is a section taken along line V-V of FIG. 4.

As shown in FIG. 4, the ends of the toggle joints 20, 21 rotatably attached to the drive shaft 19 are provided with contact pieces 23 and a coupling pin 24 selectively operable by servo adjusting means 45 (FIG. 5) connected with a suitable pressure medium source (not shown). The coupling pins 24 are provided to permit one or the other of the toggle joints 20, 21 to be selectively placed in driving connection with the drive wheel or gear 25 of the reduction gear system 18.

The ends of the connecting shafts 22 facing the container or drum 10, as shown in FIG. 2, carry as receiving means a bracket 26 of arms of which extend around the drum 10 on both sides thereof to sieze and hold the same. A longitudinally displaceable pressure pin 44 is mounted in the connecting shaft and selectively opens the bracket 26 against the bias of a tension spring in response to selective actuation by a servo-adjusting means 40 operatively connected with a suitable pressure medium supply (not shown). To assure accurate guidance and secure holding of the container or drum 10, a centering ring 27 is provided on the circumference of the drum at the level of the bracket 26.

The other ends of the connecting shafts 22, are provided with rotatably mounted rollers 28 and fixedly mounted lever arm 29 is provided having a rotatable roller 30. The rollers 28, 30 are guided in approximately U-shaped spaced guide tracks 31, 32 opening toward the inside of the housing which define the conveying path of the dewatering system. The guide tracks 31, 32 are superimposed with the respective mutual spacing determining the angular position of the container or drum 10. Furthermore, as shown in FIG. 2, the tracks 31, 32 are arranged with a horizontal displacement with respect to each other in order to permit the tracks 31, 32 to overlap.

Figure 3:
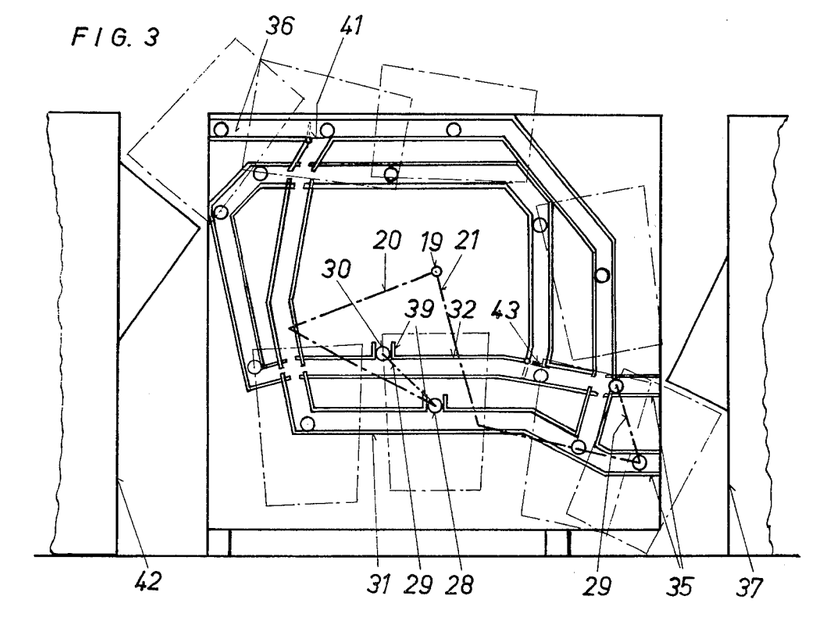
FIG. 3 is a plan view of the guide tracks of the present invention.

As shown in FIG. 3, the conveying path forms a closed track arranged in a vertical plane and is provided only in the loading station 33 and in the unloading station 34. To facilitate loading and unloading the conveyor path is provided in the area of the loading and unloading stations, respectively, with outwardly extending guide pieces 35, 36. Additionally, spring loaded flaps 41 43 are provided on selective portions of the conveying path for reasons set forth more clearly hereinbelow.

In operation, the container 10 joined to the toggle joint 21 is filled in the loading station 33 partially by a laundry or article batch falling out of the washing machine 37, while the container 10 connected to the toggle joint 20 is located in the dewatering station 38. After termination of the dewatering step, the conveying unit 4 is set into motion by activation of the drive motor by conventional means (not shown) whereby the toggle joint 21 connected with the drive wheel 25 begins to rotate in a clockwise direction. This motion in the clockwise direction pulls the container 10 along the conveying path from the loading station 33 in the direction toward the centrifugal or dewatering station 38. During the course of this movement, the contact piece 23 of the toggle joint 21 contacts the pressure piece 23 of the toggle joint 20 and urges the latter in a clockwise direction whereby both containers 10 are moved in succession by the rollers 28, 30 in guide rails 31, 32 in the conveying direction.

Upon the last container 10 reaching the centrifuging or dewatering station 38, the conveying unit is arrested by conventional means (not shown), and a pressure medium is introduced from a pressure medium source (not shown) into the bore 15 of the servo-cylinder 13 whereby the disk 14 contacts the bottom of the container 10 and lifts the container upwardly. During this step the rollers 28 and 30 are placed into engagement with guides 39 at the tops of the guide rails 31, 32. The guides are designed so that they provide lateral hold for the rollers 28 and 30 whereby the container 10 is held exactly in a predetermined position.

Due to the upward movement of the container 10, the upper edge of the container enters the receiving means or receptacle of the lid or cover 8 resulting in the lid 8 sealing the loading opening. Additionally, by the upward lifting of the container 10, the connecting shaft 22 is disposed in front of the adjusting means 40 which, upon actuation, displaces the pressure pin 44 longitudinally and opens the bracket 26 against the bias of a tension spring. The container 10 is thereby freed and can be set into rotation by activation of the drive motor 5 through conventional means (not shown) in order to effect the dewatering step.

As soon as the rollers 28, 30 have entered guide means 39, the coupling pin 44 is pulled out of the toggle joint by the adjusting means 45 and the conveying unit 4 is placed into operation with the coupling pin 24 sliding along the contact pieces 23 until it engages the bore of the toggle joint 20 and entrains the same.

During the course of further conveying movement, the rollers 28 and 30 come into contact with the upwardly leading branch of the guide tracks 31, 32 with the container 10 being held with an upwardly oriented opening. As the container is moved toward the upper end of the upwardly leading branch of the guide tracks 31, 32 the container 10 is set into rotation about the horizontal axis in a counterclockwise direction so that the container 10 is disposed approximately horizontally once the roller 28 reaches the horizontal part of the guide track 31 arranged at the top. A spring-loaded flap 41 is arranged in the inlet area and lifted when the roller 28 passes through.

Since the flap 41 is spring loaded it flips back into its initial position and closes the inlet opening after the roller 28 has passed through and the conveying motion is stopped and the direction changed whereby the roller 28 rolls over the flap 41 to the end of the guide piece 36 where the conveying motion is again interrupted.

Upon reaching the end position of the guide piece 36, the container 10 is rotated further in the counterclockwise direction so that the opening of the container 10 points downwardly and the laundry or article batch disposed therein falls into the feeding funnel of a drying machine 42, disposed downstream thereof.

After a predetermined time interval has passed, the conveying unit 4 continues its servo motion in the clockwise direction during which the rollers 28 and 30 holding the container 10 approximately horizontally roll along the upper section of the guide tracks 31, 32 until they enter the downwardly leading portion whereby the container is then again placed in the upright position as clearly shown in phantom lines in FIG. 3.

A spring-biased flap 43 is provided in the downwardly leading portion of guide track 32 and as the container procedes down the portion of the track the roller 30 presses the flap downwardly, and, after the roller has passed the flap 43, the flap flips upwardly under spring biased thereby preventing re-entrance of the roller 30 into the vertical section of the guide track 32. Upon entrance of the rollers 28 and 30 into the horizontal lower portion of the guide tracks 31, 32, the conveying direction is changed once again whereby the container 10 enters the loading station 33 upon entrance into the guide section 35, preferably, while rotating in a clockwise direction.

The above-described steps are controlled by conventional control elements, such as, for example, limit switches actuated by the toggle lever 20 or 21 or the rollers 28 and/or 30 which thereby trigger subsequent operations. Since the dewatering step occupies the longest period of time, the container 10 which is not in the dewatering unit 3 can be unloaded and reloaded during this time. After a predetermined dewatering period has passed, the transporting operation can then be initiated and takes place in a manner set forth hereinabove, wherein simultaneously the bracket 26 is closed and subsequently the container 10 is lowered until the rollers 28 and 30 are once again disposed in the guide tracks 31, 32.

Figure 6:
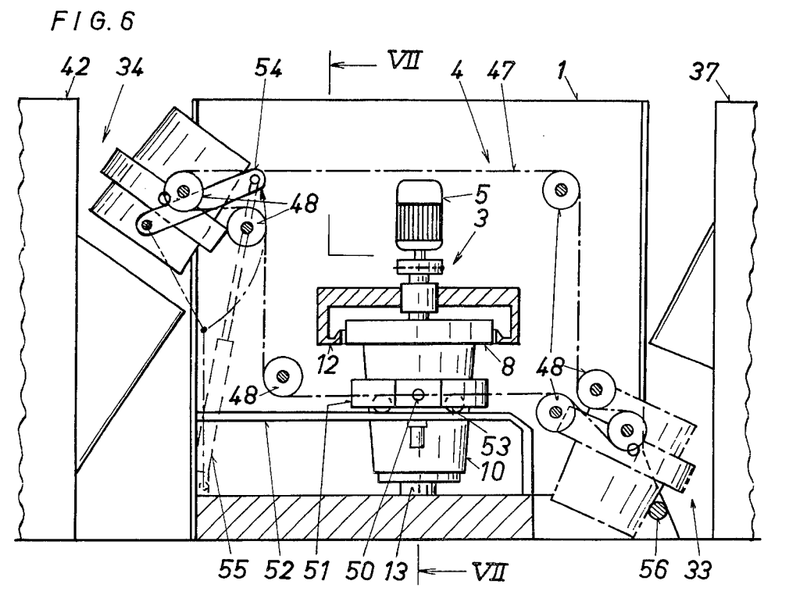
FIG. 6 is a lateral view of a further embodiment of the dewatering system according to the present invention.
Figure 7:
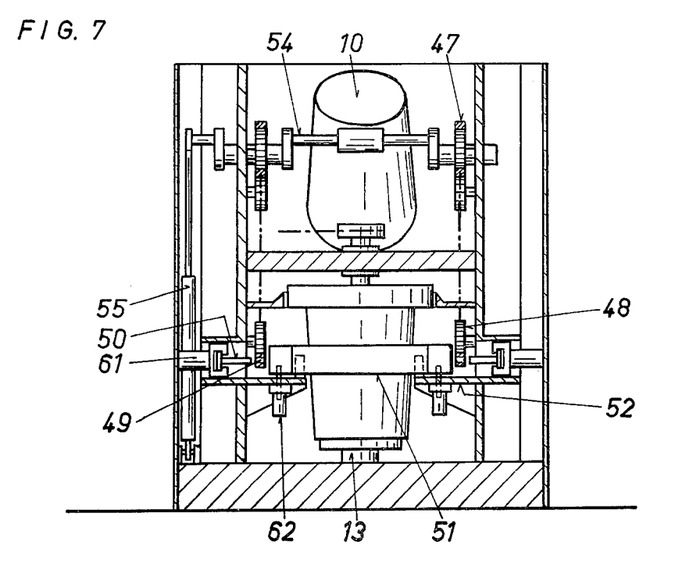
FIG. 7 is a section taken along line VII-VII of FIG. 6.

FIGS. 6 and 7 illustrate a further embodiment of the present invention wherein the conveying unit 4 is provided on each side of the container drum 10 with a closed traction means 47 in the form of a chain or the like. Conventional means (not shown) are provided for selectively rotating both traction means 47 in synchronism. The traction means 47 passes through the loading station 33, detwatering station 38 and unloading station 34 guided by correspondingly arranged guide wheels 48 and a horizontal passage opening 49. A locking bolt 50 is passed through the openings 49 and extends into an annular receiving means 51 surrounding the container or drum 10 for connecting the receiving means 51 with the traction means 47.

When the traction means 47 travels in the clockwise direction, the container 10 passes from the loading station 33 into the dewatering station 38 and then into the unloading station 34 and from there back to the loading station 33.

Supporting tracks 52 are provided in the horizontal section of the conveying path defined by the traction means 47 to support the receiving means 51. Rollers 53 are mounted in the receiving means 51 and roll along the supporting tracks 52. The suspension of the container 10 at the traction means 47 is freely pivotable thereby permitting the container 10 to always tend to retain its upright position since the center of gravity of the container 10 is located below the pivot axis.

As shown in FIG. 6, a crank lever 54 hingedly joined to the side walls 1, 2 is provided for causing the tilting of the container 10 in the unloading station 34. The lever 54 can be selectively pivoted upwardly in the counterclockwise direction by means of a servo-cylinder 55 connected with a suitable pressure medium source (not shown). During the counterclockwise pivoting, the crank lever 54 contacts the container 10 present in the unloading station 34 and pivots the container 10 in the same direction. While the container 10 can maintain its vertical position in the loading station 33, it is also possible to pivot the container 10 somewhat toward the outside in a clockwise direction by providing a fixed stop 56 contacted by the container 10 upon its entrance into the loading station 33.

Figure 8:
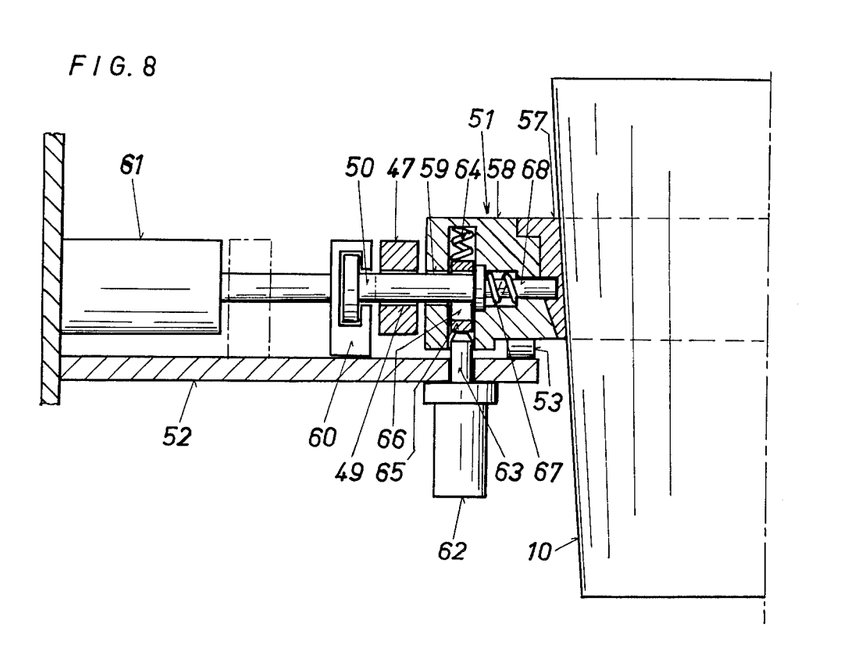
FIG. 8 is an enlarged sectional view of a receiving means for the centrifugal drum or container of the present invention.

As more clearly shown in FIG 8, the receiving means 51 includes a downwardly tapering inner ring 57 surrounding the container 10 and fixedly joined therewith. The inner ring 57 enters an outer ring 58 which is provided with diametrically opposed locking means on both sides of the container 10. The locking means are provided for establishing a connection between the traction means 47 and the outer ring 58, and for establishing a connection between the outer ring 58 and the inner ring 57.

As shown in FIG. 8, a locking bolt 50 is provided which is passed through the passage opening 49 in the traction means 47 and extends into a bore 59 provided in the outer ring 58.

Upon entrance into the dewatering station 38, the flaring head of the locking bolt 50 slides into the flush passage opening of a guide piece 60 which is fixedly connected to a servo-adjusting means 61 connected to a suitable pressure medium source (not shown). Once the container 10 has entered the dewatering station 38 and the conveying unit has been arrested, the locking bolt is caught by the guide element 60; therefore, the servo means 61 can selectively retract the guide element 60 into a position shown in phantom lines in FIG. 8.

By retraction of the guide element 60, the traction means 47 and the outer ring 58 are separated from each other and the traction means is again set into motion. At this point in time, a further servo-adjusting means 62 connected with a suitable pressure medium source (not shown) presses a pressure pin 63 into the centering bore of the outer ring 58 and comes in contact with a locking means 65 disposed therein to selectively displace the locking means upwardly against the force of a compression spring 64.

As the locking means 65 is displaced into a lifted position, a locking pin 68, under the bias of a compression spring 67, is permitted to enter into an opening 66 provided in the locking means 65. Subsequently, the locking pin 68 is retracted from the corresponding recess in the inner ring 57 and releases the coupling between the inner ring 57 and the outer ring 58 whereby the container 10 is released from the receptacle or receiving means 51 and the servo-cylinder 13 can then lift the container 10 so that it can be set into rotation.

After the dewatering step and after the container 10 has been placed into the initial position, the servo means 61 and 62 resume there terminal position after the traction means 47 has been arrested thereby reestablishing the connections between the traction means 47 and the outer ring 58 and between the outer ring 58 and the inner ring 57 with the pressure pin 63 being released at the same time. With the various connections being re-established the container 10 can now be transported into the unloading station 34.

As indicated hereinabove, the sequence of operations can be controlled by conventional control elements, for example, limit switches actuated when the container 10 reaches predetermined positions along the conveyor paths.

While in both of the embodiments described hereinabove, the containers 10 move a conveying path disposed in a vertical plane from one station to the next, it is also possible to arrange the conveying path for the containers 10 in a horizontal plane as shown in a further embodiment of the present invention illustrated in FIG. 9.

Figure 9:
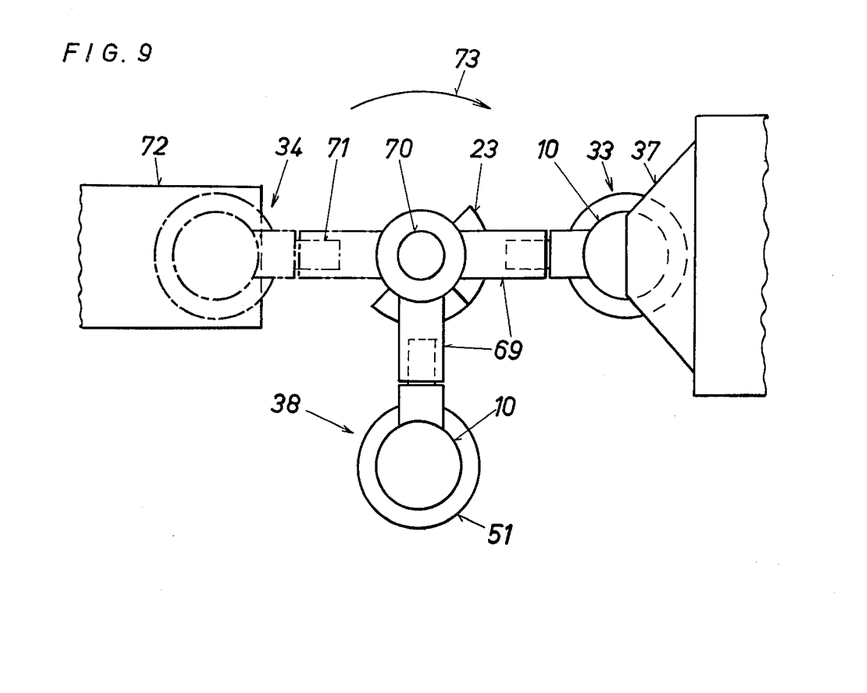
FIG. 9 is a top view of a further embodiment of the dewatering apparatus according to the present invention.

As clearly shown in FIG. 9, the receiving means 51 are mounted to radial arms 69 rotatable about a vertical shaft 70 which serves as the conveying unit of this embodiment with each of the radial arms 69 be selectively coupled with the shaft 70. For positive entrainment of the radial arms 69 in the direction of arrow 73, pressure pieces 23 are provided.

For unloading in the unloading station 34, the container or drum 10 may be selectively rotated about an axle 71 by conventional means (not shown); however, it is also possible to provide a selectively operable trapdoor means (not shown) in the container or drum 10 to permit the dewatered material to fall downwardly onto a belt 72 after the trapdoor has been opened.

While the above description employs centrifugal assemblies in the dewatering units, it is also possible to utilize dewatering presses of any desired construction as the dewatering units.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An apparatus for the cyclic extraction of a liquid from articles, which includes a loading station means and an unloading station means, comprising: a plurality of container means for receiving the articles from which the liquid is to be extracted, means for extracting the liquid from the articles disposed in said container means, means operatively connected with said container means for selectively guiding said container means from the loading station means to said extracting means and from said extracting means to the unloading station means, and transporting means independent of said extracting means for transporting one of said plurality of container means from said extracting means to the unloading station means during the extraction of another of said plurality of container means disposed in said extracting means.

2. An apparatus according to claim 1, wherein said guiding means defines a self-contained conveyor path entering said extracting means only once.

3. An apparatus according to claim 1, wherein guiding means are provided for guiding said container means from the unloading station means to the loading station means.

4. An apparatus according to claim 1, wherein a means is provided for tilting said container means in the unloading station.

5. An apparatus according to claim 1, wherein guiding means are provided for guiding said container means from the unloading station means to the loading station means.

6. An apparatus for the cyclic extraction of a liquid from articles, which includes a loading station means and an unloading station means, comprising: container means for receiving the articles from which the liquid is to be extracted, means for extracting the liquid from the articles disposed in said container means, means operatively connected with said container means for selectively guiding said container means from the loading station means to said extracting means and from said extracting means to the unloading station means, and means independent of said extracting means for transporting said container means from said extracting means to said unloading station means, said guiding means includes a means for receiving and holding said container means, and means are provided for selectively coupling said receiving means with said transporting means.

7. An apparatus according to claim 6, wherein a plurality of container means are provided, each of said plurality of container means being provided with a receiving means, and wherein means are provided for selectively coupling each of said receiving means with said transporting means.

8. An apparatus according to claim 7, wherein said guide means includes a pair of superimposed guide tracks, each of said container means being provided with roller means selectively disposed in said guide tracks, and wherein said means for selectively coupling includes a pair of pivotally mounted toggle joint disposed substantially centrally of said guide tracks.

9. An apparatus according to claim 8, wherein said guide tracks are provided with further guide means at said extracting means for receiving and centering said roller means of a respective container means, said further guide means being disposed substantially at right angles to the direction of travel of said container means, and wherein means are provided for selectively lifting said receiving means and said container means out of said guide track at said extracting means.

10. An apparatus according to claim 9, wherein additional means are provided for releasing said receiving means and holding said receiving means in said lifted position.

11. An apparatus for the cyclic extraction of a liquid from articles, which includes a loading station means and an unloading station means, comprising: container means for receiving the articles from which the liquid is to be extracted, means for extracting liquid from the articles disposed in said container means, means operatively connected with said container means for selectively guiding said container means from the loading station means to said extracting means and from said extracting means to the unloading station means, and means independent of said extracting means for transporting said container means from said extracting means to the unloading station means, said means for transporting said container means includes continuous traction means, locking means are provided for selectively coupling said container means with said continuous traction means.

12. An apparatus according to claim 11, wherein said continuous traction means is a chain.

13. An apparatus according to claim 11, wherein means are provided at the unloading station means for selectively tilting said container means.

14. An apparatus according to claim 13, wherein said tilting means includes a rotatably mounted lever means and a servo means for selectively moving said lever against said container to tilt the same.

15. An apparatus according to claim 14, wherein a tilting means is provided at the loading station means.

16. An apparatus according to claim 11, wherein said guiding means includes means for receiving and holding said container means and wherein said locking means are provided on diametrically disposed points of said receiving means.

17. An apparatus according to claim 16, wherein servo means are provided for selectively operating said locking means.

18. An apparatus according to claim 17, wherein said locking means includes locking bolts disposed in said receiving means.

19. An apparatus according to claim 16, wherein said receiving and holding means includes an inner ring secured to said container means, an outer ring means for receiving said inner ring, and a means for selectively coupling said inner and outer rings.

20. An apparatus according to claim 19, wherein said means for selectively coupling said inner and outer rings includes locking pins disposed in said inner and outer rings.

21. An apparatus according to claim 20, wherein a compression spring means is provided for urging said locking pins into a released position, and wherein said locking means on said receiving means selectively presses said locking pins into a locking position.

22. An apparatus according to claim 21, wherein a further locking means is provided and is operatively connected with said locking means on said receiving means for holding said locking means and said locking pins in said locking position.

23. An apparatus according to claim 22, wherein servo means are provided for selectively releasing said locking means and said locking pins from said locking position.

24. An apparatus according to claim 23, wherein a further compression spring is provided for urging said further locking means into a released position.

25. An apparatus for the cyclic extraction of a liquid from articles, which includes a loading station means and an unloading station means, comprising: a plurality of container means for receiving the articles from which the liquid is to be extracted, means for extracting the liquid from the articles disposed in said container means, means operatively connected with said container means for selectively guiding said container means from the loading station means to said extracting means and from said extracting means to said unloading station means, and means independent of said extracting means for transporting said container means from said extracting means to the unloading station means, said guiding means includes a plurality of radially extending arms, and means are provided for selectively rotatably mounting a container means on each of said radial arms.

26. An apparatus according to claim 24, wherein said transporting means includes a drive means and a vertically extending shaft operatively connected with said drive means, said vertically extending shaft being disposed substantially centrally of said radially extending arms and being operatively connected therewith.

27. An apparatus for the cyclic extraction of a liquid from articles, which includes a loading station means and an unloading station means, comprising: container means for receiving the articles from which the liquid is to be extracted, means for extracting the liquid from the articles disposed in said container means, means operatively connected with said container means for selectively guiding said container means from the loading station means to said extracting means and from said extracting means to the unloading station means, and means independent of said extracting means for transporting said container means from said extracting means to the unloading station means, said guide means includes a pair of superimposed guide tracks, said container means being provided with roller means selectively disposed in said guide tracks, and means are provided for selectively coupling said container means with said transporting means including a pair of pivotally mounted toggle joint means disposed substantially centrally of said guide tracks.

28. An apparatus for the cyclic extraction of a liquid from articles, which includes a loading station means and an unloading station means, comprising: container means for receiving the articles from which the liquid is to be extracted, means for extracting the liquid from the articles disposed in said container means, means operatively connected with said container means for selectively guiding said container means from the loading station means to said extracting means, from said extracting means to the unloading station means and from the unloading station means to the loading station means, and means independent of said extracting means for transporting said container means from said extracting means to the unloading station means, said guiding means includes a pair of superimposed guide tracks, said container means is provided with a plurality of roller means selectively disposed in said guide tracks, and means are provided for selectively coupling said container means to said transporting means.

29. An apparatus according to claim 18, wherein a plurality of container means are provided, each of said container means being provided with roller means disposed in said guide tracks, and wherein said guide track is provided with further guide means at said extracting means for receiving and centering said roller means of a respective container means, and wherein means are provided for selectively lifting said container means out of said guide tracks at said extracting means.

30. An apparatus according to claim 29, wherein said means for lifting said container means includes a selectively operable servo means.

31. An apparatus according to claim 30, wherein said extracting means includes a cover means for covering the opening of said container means when said container means is lifted by said servo means.

32. An apparatus according to claim 31, wherein means are provided for holding said container means in said lifted position.

33. An apparatus according to claim 32, wherein means are provided in said cover means for discharging the extracted liquid from said container means.

* * * * *